(12) United States Patent
Kowase

(10) Patent No.: US 11,688,558 B2
(45) Date of Patent: Jun. 27, 2023

(54) CERAMIC ELECTRONIC COMPONENT AND METHOD OF MANUFACTURING THE SAME

(71) Applicant: TAIYO YUDEN CO., LTD., Tokyo (JP)

(72) Inventor: Yusuke Kowase, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 34 days.

(21) Appl. No.: 17/093,988

(22) Filed: Nov. 10, 2020

(65) Prior Publication Data

US 2021/0159014 A1 May 27, 2021

(30) Foreign Application Priority Data

Nov. 22, 2019 (JP) .............................. JP2019-211342

(51) Int. Cl.
  *H01G 4/248* (2006.01)
  *H01G 13/00* (2013.01)
  *H01G 4/33* (2006.01)

(52) U.S. Cl.
  CPC .............. *H01G 4/248* (2013.01); *H01G 4/33* (2013.01); *H01G 13/006* (2013.01)

(58) Field of Classification Search
  CPC ........ H01G 4/248; H01G 4/33; H01G 13/006; H01G 4/30
  See application file for complete search history.

(56) References Cited

U.S. PATENT DOCUMENTS

| | | | | |
|---|---|---|---|---|
| 5,905,000 A | * | 5/1999 | Yadav | C01B 32/956 429/495 |
| 5,952,040 A | * | 9/1999 | Yadav | C04B 41/009 427/126.3 |
| 2005/0219795 A1 | * | 10/2005 | Murasawa | H01G 4/30 361/321.2 |
| 2006/0087796 A1 | * | 4/2006 | Yamazaki | C04B 35/4682 361/321.2 |
| 2010/0053843 A1 | * | 3/2010 | Muraki | C04B 35/4682 501/137 |

(Continued)

FOREIGN PATENT DOCUMENTS

JP  2010-150082 A  7/2010
JP  2014-7187 A   1/2014

*Primary Examiner* — Dion R. Ferguson
(74) *Attorney, Agent, or Firm* — Chen Yoshimura LLP

(57) ABSTRACT

A ceramic electronic component includes a multilayer chip having a rectangular parallelepiped shape and including dielectric layers and internal electrode layers alternately stacked, the dielectric layers being mainly composed of ceramic, the internal electrode layers being alternately exposed to two edge faces of the multilayer chip opposite to each other, and external electrodes respectively formed on the two edge faces, wherein an average crystal grain size of the ceramic in a cross section is 200 nm or less in a dielectric portion, and a CV value of a grain size distribution of crystal grains of the ceramic in the cross section is less than 38% in the dielectric portion, the dielectric portion being defined as a region made of the ceramic in the multilayer chip that is in contact with one of the external electrodes and that has a width of 5 μm from said one of the external electrodes.

10 Claims, 12 Drawing Sheets

(56) References Cited

U.S. PATENT DOCUMENTS

| | | | |
|---|---|---|---|
| 2013/0128411 A1* | 5/2013 | Tahara | H01G 4/12 |
| | | | 361/321.2 |
| 2013/0342956 A1* | 12/2013 | Konishi | H01G 4/12 |
| | | | 361/301.4 |
| 2013/0342957 A1* | 12/2013 | Konishi | B32B 18/00 |
| | | | 423/598 |
| 2014/0009864 A1* | 1/2014 | Takashima | H01G 4/1227 |
| | | | 361/301.4 |
| 2016/0225527 A1* | 8/2016 | Kawamoto | H01G 4/30 |
| 2018/0294101 A1* | 10/2018 | Inoue | H01G 4/1227 |
| 2018/0336999 A1* | 11/2018 | Kitamura | H01G 4/30 |
| 2019/0131075 A1* | 5/2019 | Park | H01G 4/1227 |
| 2019/0139704 A1* | 5/2019 | Arai | H01G 4/2325 |
| 2019/0172640 A1* | 6/2019 | Inomata | H01G 4/30 |
| 2019/0287720 A1* | 9/2019 | Mori | H01G 4/012 |
| 2021/0020376 A1* | 1/2021 | Sasabayashi | C04B 35/62823 |
| 2021/0159014 A1* | 5/2021 | Kowase | H01G 13/006 |

\* cited by examiner

AVERAGE GRAIN SIZE: LARGE

AVERAGE GRAIN SIZE: SMALL
GRAIN SIZE DISTRIBUTION: BROAD

AVERAGE GRAIN SIZE: SMALL
GRAIN SIZE DISTRIBUTION: SHARP

FIG. 10A

| | THICKNESS OF BASE LAYER [μm] | THICKNESS OF INTERNAL ELECTRODE LAYER [μm] | THICKNESS OF DIELECTRIC LAYER [μm] | AVERAGE CRYSTAL GRAIN SIZE [nm] | CV VALUE [%] |
|---|---|---|---|---|---|
| COMPARATIVE EXAMPLE 1 | 19.1 | 0.61 | 0.55 | 203 | 19 |
| COMPARATIVE EXAMPLE 2 | 12.3 | 0.45 | 0.56 | 210 | 20 |
| EXAMPLE 1 | 12.1 | 0.43 | 0.53 | 183 | 24 |
| EXAMPLE 2 | 12.3 | 0.44 | 0.55 | 151 | 26 |
| EXAMPLE 3 | 12.5 | 0.43 | 0.54 | 132 | 29 |
| EXAMPLE 4 | 11.9 | 0.45 | 0.55 | 101 | 35 |
| COMPARATIVE EXAMPLE 3 | 12.2 | 0.46 | 0.53 | 95 | 38 |
| COMPARATIVE EXAMPLE 4 | 12.1 | 0.46 | 0.55 | 71 | 49 |

FIG. 10B

| | CAPACITANCE [μF] | JUDGEMENT OF ACCEPTANCE FOR CAPACITANCE | JUDGEMENT OF ACCEPTANCE IN MOISTURE RESISTANCE TEST | JUDGEMENT OF ACCEPTANCE FOR PEELING |
|---|---|---|---|---|
| COMPARATIVE EXAMPLE 1 | 17.8 | × | ○ | ○ |
| COMPARATIVE EXAMPLE 2 | 20.9 | ○ | × | × |
| EXAMPLE 1 | 21.0 | ○ | ○ | ○ |
| EXAMPLE 2 | 20.7 | ○ | ○ | ○ |
| EXAMPLE 3 | 20.9 | ○ | ○ | ○ |
| EXAMPLE 4 | 19.9 | ○ | ○ | ○ |
| COMPARATIVE EXAMPLE 3 | 17.5 | × | × | × |
| COMPARATIVE EXAMPLE 4 | 16.1 | × | × | × |

FIG. 10C

|  | PORE RATIO | BDV |
|---|---|---|
| COMPARATIVE EXAMPLE 2 | 0 % | 25 V |
| EXAMPLE 1 | 2 % | 32 V |
| EXAMPLE 2 | 5 % | 38 V |
| EXAMPLE 3 | 7 % | 37 V |
| EXAMPLE 4 | 10 % | 35 V |
| COMPARATIVE EXAMPLE 3 | 13 % | 19 V |
| COMPARATIVE EXAMPLE 4 | 15 % | 13 V |

CERAMIC ELECTRONIC COMPONENT AND METHOD OF MANUFACTURING THE SAME

FIELD

A certain aspect of the present disclosure relates to a ceramic electronic component and a method of manufacturing the same.

BACKGROUND

In high-frequency communication systems typified by mobile phones, ceramic electronic components such as multilayer ceramic capacitors having a small size and a large capacitance are used to impart further functionalities as disclosed in, for example, Japanese Patent Application Publication Nos. 2010-150082 and 2014-7187.

SUMMARY OF THE INVENTION

Such ceramic electronic components can have a higher capacity by reducing the thicknesses of the dielectric layers and the internal electrode layers.

However, reducing of the thicknesses of the internal electrode layers may decrease the contact area between the internal electrode layers and the external electrode, resulting in peeling of the external electrode.

The present invention has a purpose of providing a ceramic electronic component and a method of manufacturing the same that are capable of inhibiting peeling of the external electrodes.

According to a first aspect of the embodiments, there is provided a ceramic electronic component including: a multilayer chip having a substantially rectangular parallelepiped shape and including dielectric layers and internal electrode layers that are alternately stacked, the dielectric layers being mainly composed of ceramic, the internal electrode layers being alternately exposed to two edge faces of the multilayer chip opposite to each other; and a pair of external electrodes respectively formed on the two edge faces, wherein an average crystal grain size of the ceramic in a cross section is 200 nm or less in a dielectric portion that is in contact with one of the external electrodes, and a CV value of a grain size distribution of crystal grains of the ceramic in the cross section is less than 38% in the dielectric portion, the dielectric portion being defined as a region made of the ceramic in the multilayer chip that is in contact with the one of the external electrodes and that has a width of 5 μm from said one of the external electrodes.

In the above-mentioned ceramic electronic component, each of the internal electrode layers may have a thickness of 0.45 μm or less.

In the above-mentioned ceramic electronic component, the dielectric portion may be in an end margin where first internal electrode layers of the internal electrode layers face each other with no second internal electrode layer interposed therebetween, the first internal electrode layers being exposed to a first edge face of the two edge faces, the second internal electrode layer being exposed to a second edge face different from the first edge face of the two edge faces.

In the above-mentioned ceramic electronic component, each of the external electrodes may have a structure in which a plated layer is formed on a base layer, and the base layer may have a thickness of 12.5 μm or less.

In the above-mentioned ceramic electronic component, the base layer may be a sputtering film or a chemical-vapor-deposited film.

In the above-mentioned ceramic electronic component, a pore may be formed inside the crystal grain, and a ratio of a cross-section area of the pore to a cross-section area of the crystal grain of the ceramic may be 2% or greater and 10% or less in a cross-section of each of the dielectric layers.

In the above-mentioned ceramic electronic component, the dielectric layers may have thicknesses of 0.5 μm or less.

According to a second aspect of the embodiments, there is provided a method of manufacturing a ceramic electronic component, the method including: alternately stacking green sheets for dielectric layers and conductive pastes for internal electrode layers so that the internal electrode layers are alternately exposed to two edge faces opposite to each other so as to form a ceramic multilayer structure having a substantially rectangular parallelepiped shape; firing the ceramic multilayer structure to form a multilayer chip; and forming a pair of external electrodes respectively on two edge faces of the multilayer chip, wherein the firing includes adjusting a firing condition so that an average crystal grain size of ceramic, which is a main component of the dielectric layers, in a cross section becomes 200 nm or less in a dielectric portion that is in contact with at least one of the external electrodes, and a CV value of a grain size distribution of crystal grains of the ceramic in the cross section becomes less than 38% in the dielectric portion, the dielectric portion being defined as a region made of the ceramic in the multilayer chip that is in contact with the one of the external electrodes and that has a width of 5 μm from said one of the external electrodes.

According to a third aspect of the embodiments, there is provided a method of manufacturing a ceramic electronic component, the method including: alternately stacking green sheets for dielectric layers and first conductive pastes for internal electrode layers so that the internal electrode layers are alternately exposed to two edge faces opposite to each other so as to form a ceramic multilayer structure having a substantially rectangular parallelepiped shape; and disposing a second conductive paste for an external electrode on each of two edge faces of the ceramic multilayer structure; and firing the second conductive pastes together with the ceramic multilayer structure to form a multilayer chip from the ceramic multilayer structure and form a pair of external electrodes from the second conductive pastes, wherein the firing includes adjusting a firing condition so that an average crystal grain size of ceramic, which is a main component of the dielectric layers, in a cross section becomes 200 nm or less in a dielectric portion that is in contact with at least one of the external electrodes, and a CV value of a grain size distribution of crystal grains of the ceramic in the cross section becomes less than 38% in the dielectric portion, the dielectric portion being defined as a region made of the ceramic in the multilayer chip that is in contact with the one of the external electrodes and that has a width of 5 μm from said one of the external electrodes.

BRIEF DESCRIPTION OF THE DRAWINGS

FIG. 10A to FIG. 10C present results of the examples and the comparative examples.

DETAILED DESCRIPTION

Hereinafter, an exemplary embodiment will be described with reference to the accompanying drawings.

Exemplary Embodiment

Figure 1:
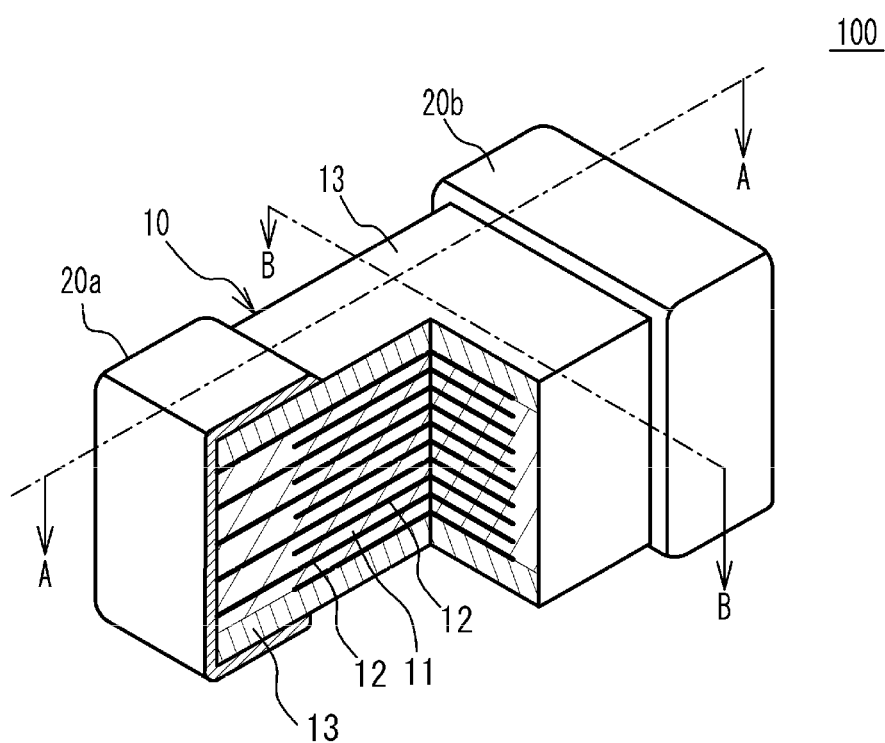
FIG. 1 is a partial cross-sectional perspective view of a multilayer ceramic capacitor.
Figure 2:
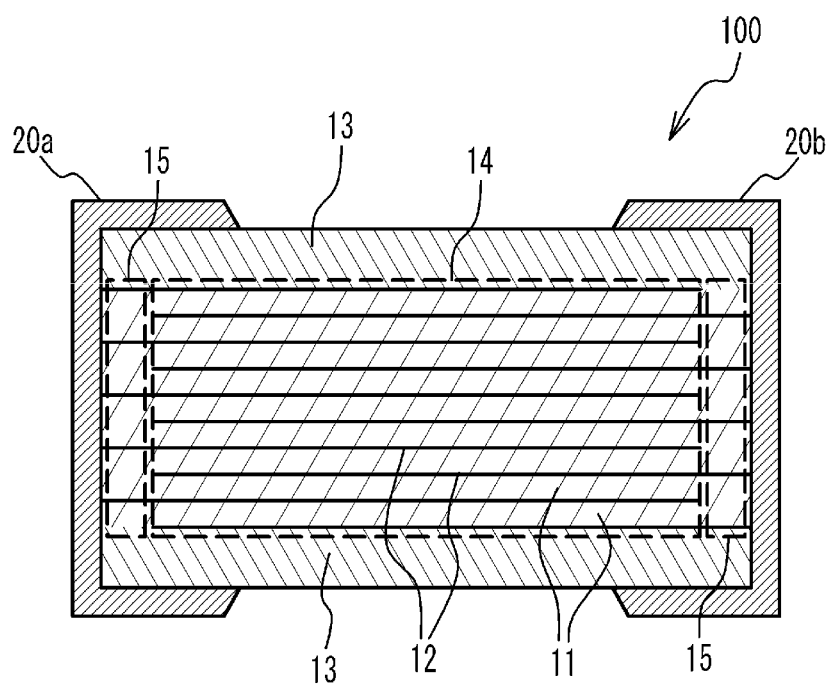
FIG. 2 is a cross-sectional view taken along line A-A in FIG. 1.
Figure 3:
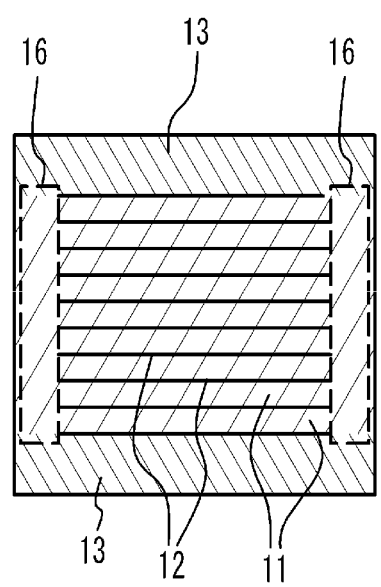
FIG. 3 is a cross-sectional view taken along line B-B in FIG. 1.

FIG. 1 is a partial cross-section perspective views of a multilayer ceramic capacitor 100 in accordance with an exemplary embodiment. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The dielectric layer 11 is mainly composed of a ceramic material having a perovskite structure expressed by a general formula $ABO_3$. The perovskite structure includes $ABO_{3-\alpha}$ having an off-stoichiometric composition. Examples of such a ceramic material include, but are not limited to, barium titanate ($BaTiO_3$), calcium zirconate ($CaZrO_3$), calcium titanate ($CaTiO_3$), strontium titanate ($SrTiO_3$), and $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, the region where the internal electrode layer 12 connected to the external electrode 20a faces the internal electrode layer 12 connected to the external electrode 20b is a region where capacitance is generated in the multilayer ceramic capacitor 100. Thus, this region is referred to as a capacitance region 14. That is, the capacitance region 14 is a region where two adjacent internal electrode layers 12 connected to different external electrodes face each other.

The region where the internal electrode layers 12 connected to the external electrode 20a face each other with no internal electrode layer 12 connected to the external electrode 20b interposed therebetween is referred to as an end margin 15. The region where the internal electrode layers 12 connected to the external electrode 20b face each other with no internal electrode layer 12 connected to the external electrode 20a interposed therebetween is also the end margin 15. That is, the end margin 15 is a region where the internal electrode layers 12 connected to one of the external electrodes face each other with no internal electrode layer 12 connected to the other of the external electrodes interposed therebetween. The end margin 15 is a region where no capacitance is generated.

As illustrated in FIG. 3, in the multilayer chip 10, the region from each of the two side faces of the multilayer chip 10 to the internal electrode layers 12 is referred to as a side margin 16. That is, the side margin 16 is a region that covers each of the edges, extending toward the respective side faces of the multilayer structure, of the stacked internal electrode layers 12.

Figure 4A:
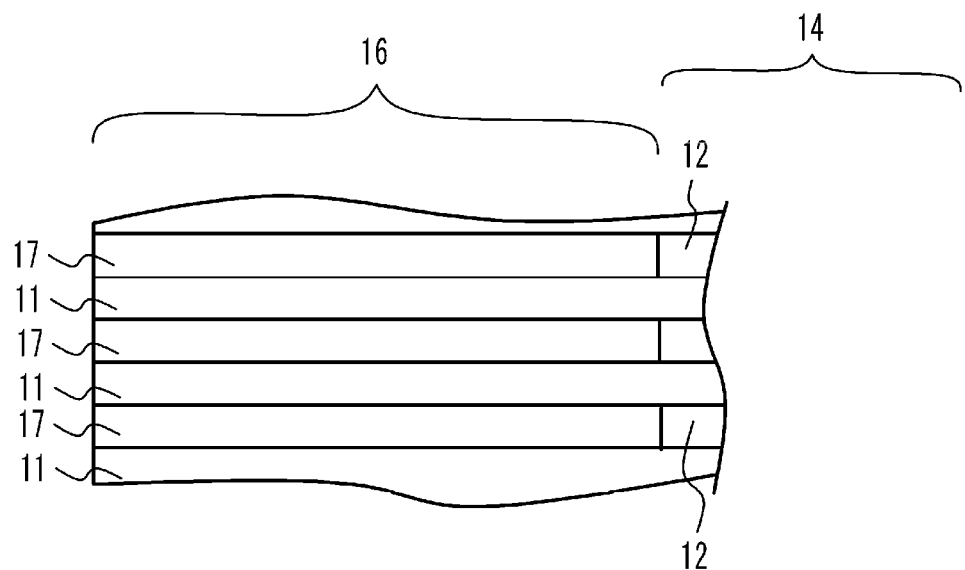
FIG. 4A is an enlarged view of the cross-section of a side margin.
Figure 4B:
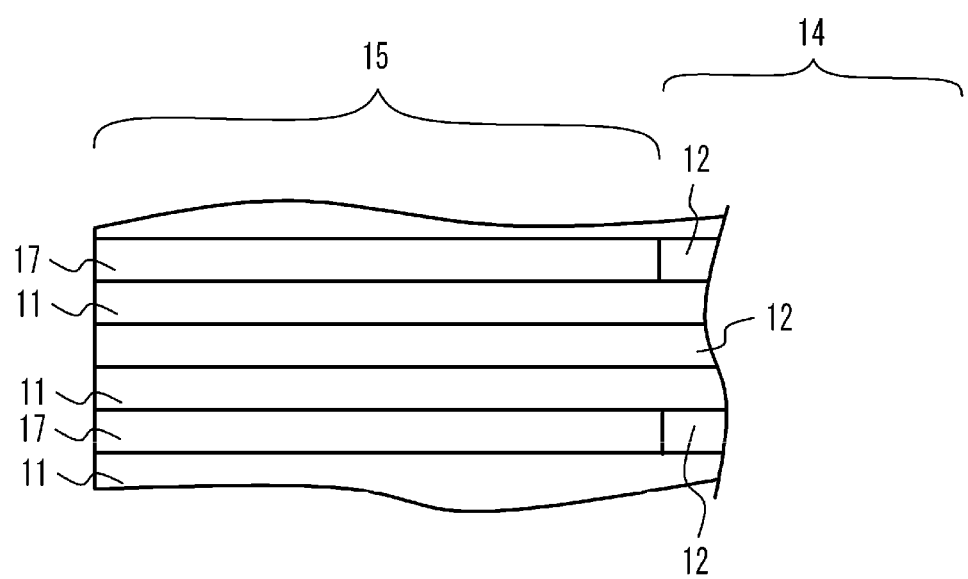
FIG. 4B is an enlarged view of the cross-section of an end margin.

FIG. 4A is an enlarged view of the cross-section of the side margin 16. The side margin 16 has a structure in which the dielectric layers 11 and inverse pattern layers 17 are alternately stacked in the direction (the stack direction) in which the dielectric layers 11 and the internal electrode layers 12 are stacked in the capacitance region 14. In FIG. 4A and FIG. 4B, hatching for expressing the cross-section is omitted. Each dielectric layer 11 in the capacitance region 14 and the corresponding dielectric layers 11 in the side margins 16 form a continuous layer. This structure reduces the level difference between the capacitance region 14 and the side margins 16.

FIG. 4B is an enlarged view of the cross-section of the end margin 15. In comparison with the side margin 16, in the end margin 15, every other internal electrode layer 12 of the stacked internal electrode layers 12 extends to the outer end face of the end margin 15. In addition, in the layers where the internal electrode layers 12 extend to the outer end face of the end margin 15, no inverse pattern layer 17 is stacked.

Each dielectric layer 11 in the capacitance region 14 and the corresponding dielectric layers 11 in the end margins 15 form a continuous layer. This structure reduces the level difference between the capacitance region 14 and the end margins 15.

Figure 5:
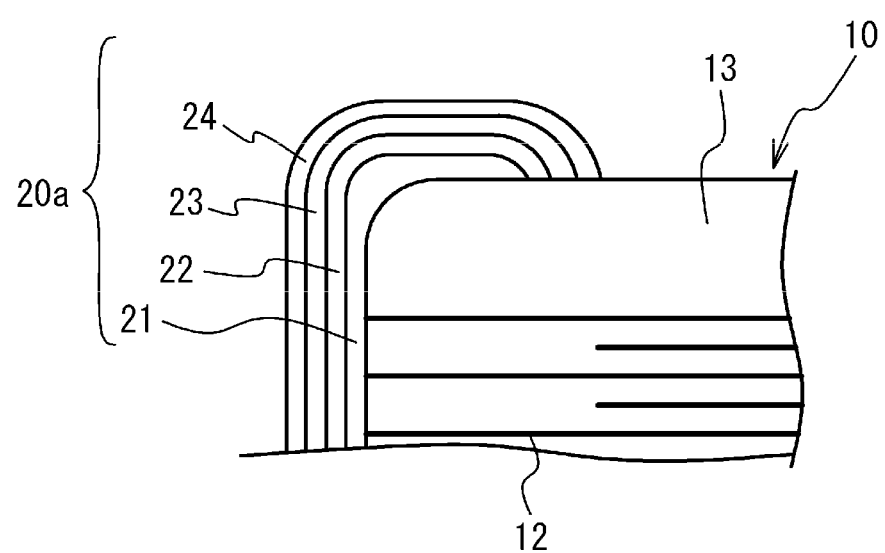
FIG. 5 is a cross-sectional view of an external electrode and is a partial cross-sectional view taken along line A-A in FIG. 1.

FIG. 5 is a cross-sectional view of the external electrode 20a, and is a partial cross-sectional view taken along line A-A in FIG. 1. In FIG. 5, hatching for expressing the cross-section is omitted. As illustrated in FIG. 5, the external electrode 20a has a structure designed to have a plated layer formed on a base layer. For example, the external electrode 20a has a structure in which a Cu plated layer 22, a Ni plated layer 23, and a Sn plated layer 24 are sequentially formed on a base layer 21. The base layer 21, the Cu plated layer 22, the Ni plated layer 23, and the Sn plated layer 24 extend from each of the edge faces of the multilayer chip 10 to the top face and the bottom face in the stack direction and two side faces of the multilayer chip 10. Although FIG. 5 illustrates the structure of the external electrode 20a, the external electrode 20b has the same structure.

The multilayer ceramic capacitor 100 is desired to have a smaller size and a larger capacitance. It may be considered to reduce the thicknesses of the dielectric layers 11 and the internal electrode layers 12 to increase the numbers of the dielectric layers 11 and the internal electrode layers 12 that are stacked. In this case, a smaller size and a larger capacitance can be achieved. However, when the thickness of the internal electrode layer 12 is reduced, the contact area between each internal electrode layer 12 and the corresponding external electrode 20a or 20b decreases, which may result in peeling of the external electrodes 20a and 20b.

In particular, when the external electrodes 20a and 20b are thinned, the external electrodes 20a and 20b are more likely to peel. For example, when the internal electrode layer 12 has a thickness less than 0.5 μm (for example, 0.45 μm or less, 0.3 μm or less, or 0.1 μm or less), and the base layer 21 has a thickness less than 15 μm (for example, 12.5 μm or less, 10 μm or less, or 5 μm or less), the external electrodes 20a and 20b are more likely to peel. In particular, when the external electrodes 20a and 20b are formed of a sputtering film or chemical-vapor-deposited film containing no co-material and no glass, the external electrodes 20a and 20b are more likely to peel.

Figure 6A:
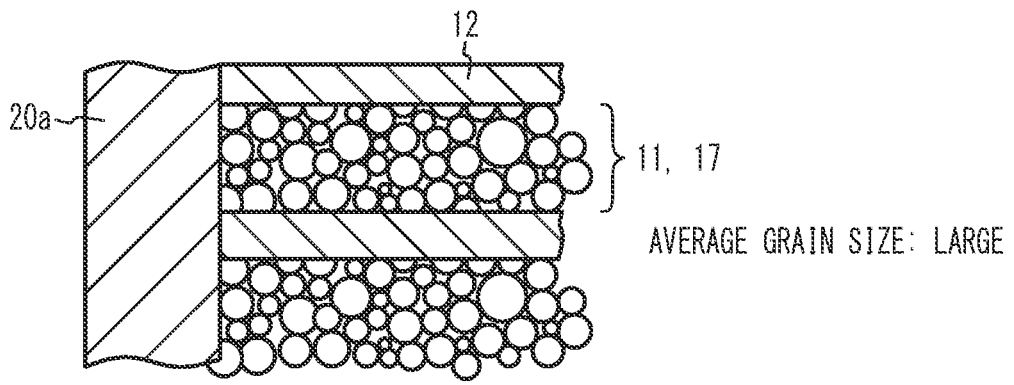
FIG. 6A to FIG. 6C are enlarged cross-sectional views of the vicinity of the external electrode.
Figure 6B:
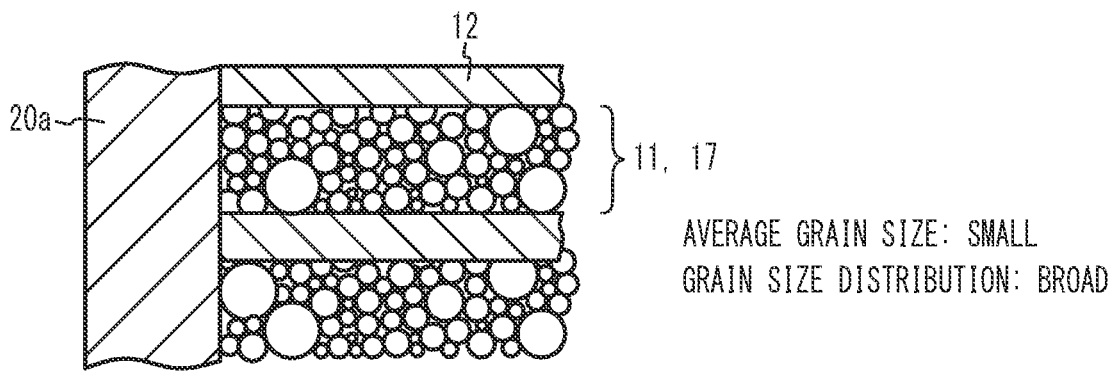
Figure 6C:
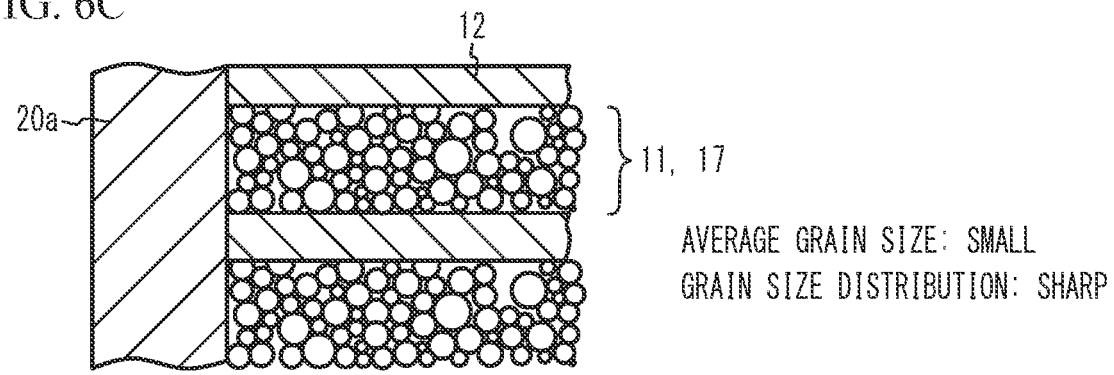

Here, the crystal grain size of dielectric portions (the dielectric layers 11 and the inverse pattern layers 17) that are in contact with the respective external electrodes 20a and 20b and the bond strength between the dielectric portions and the respective external electrodes 20a and 20b are examined. FIG. 6A to FIG. 6C are enlarged cross-sectional views of the vicinity of the external electrode 20a. Hatching for expressing crystal grains of the dielectric portion is omitted.

In the example of FIG. 6A, the crystal grain size of the dielectric portion that is in contact with the external electrode 20a is comparatively large. In this case, the space on the boundary face between the dielectric portion and the external electrode 20a is large. Thus, the contact area between the dielectric portion and the external electrode 20a is comparatively small. Therefore, the bond strength between the dielectric portion and the external electrode 20a is small, and the external electrode 20a may thereby peel.

In the example of FIG. 6B, the average grain size of the crystal grains of the dielectric portion that is in contact with the external electrode 20a is comparatively small, but the grain size distribution is broad, and large grains are also contained. In this case, when the large particle is in contact with the external electrode 20a, the space on the boundary face between the dielectric portion and the external electrode 20a is large. Thus, the contact area between the dielectric portion and the external electrode 20a is comparatively small. Therefore, the bond strength between the dielectric portion and the external electrode 20a is small, and the external electrode 20a may thereby peel.

In the example of FIG. 6C, the average grain size of the crystal grains of the dielectric portion that is in contact with the external electrode 20a is comparatively small, and the grain size distribution is sharp. In this case, the number of large grains is small, and the contact area between the dielectric portion and the external electrode 20a is thus large. Therefore, the bond strength between the dielectric portion and the external electrode 20a is large, and peeling of the external electrode 20a is inhibited.

Hence, in the multilayer ceramic capacitor 100 in accordance with the present embodiment, the average grain size of the crystal grains of the dielectric portions (the dielectric layers 11 and the inverse pattern layers 17) that are in contact with the respective external electrodes 20a and 20b is adjusted to be small, and the grain size distribution is adjusted to be sharp. Specifically, the average crystal grain size of the dielectric portions that are in contact with the respective external electrodes 20a and 20b is 200 nm or less, and the CV value (the standard deviation/the average crystal grain size) of the grain size distribution of the crystal grains is less than 38%. In this case, sufficiently small average crystal grain size is achieved. In addition, sufficiently sharp grain size distribution is achieved. This configuration provides the large bond strength between the dielectric portions and the respective external electrodes 20a and 20b, inhibiting peeling of the external electrodes 20a and 20b. The average crystal grain size of the dielectric portions is preferably 180 nm or less, more preferably 150 nm or less. In addition, the CV value is preferably 35% or less, more preferably 30% or less.

The section of the dielectric portion that is in contact with one of the external electrodes 20a and 20b for which the average crystal grain size and the CV value are calculated is not particularly limited as long as it has a width of 5 μm from the external electrode. At least, the sections of the dielectric portions that are in contact with the respective external electrodes 20a and 20b are in the vicinities of the respective external electrodes 20a and 20b. As an example, the sections of the dielectric portions that are in contact with the respective external electrodes 20a and 20b are the dielectric layers 11 and the inverse pattern layers 17 in the respective end margins 15.

Since the crystal grains of the dielectric portions that are in contact with the respective external electrodes 20a and 20b are located further out than the remaining crystal grains when sintering, these crystal grains are easily affected by the heat during firing. Thus, crystal grains of the of the dielectric portions that are in contact with the respective external electrodes 20a and 20b grow more easily than crystal grains of the dielectric portions in the capacitance region 14.

In the multilayer ceramic capacitor 100 including no inverse pattern layer 17, the dielectric portions that are in contact with the respective external electrodes 20a and 20b are the dielectric layers 11 in the vicinities of the external electrodes 20a and 20b, and are, for example, the dielectric layers 11 in the end margins 15.

Next, pores within the grain of the main component ceramic of the dielectric layer 11 in the capacitance region 14 will be focused on. When no pore is formed within the grain of the main component ceramic, application of a voltage between the internal electrode layers is likely to cause a structural breakdown caused by electrostriction and deteriorate withstand voltage characteristics. Particularly, it is considered that the withstand voltage characteristics are more likely to deteriorate under the ultrathin layer condition that the thickness of the dielectric layer 11 is 0.5 µm or less. Thus, in the present embodiment, pores are formed within the grain of the main component ceramic of the dielectric layer 11. This structure inhibits a structural breakdown caused by electrostriction even when a voltage is applied between the internal electrode layers, and thus, inhibits deterioration in withstand voltage characteristics.

Figure 7:
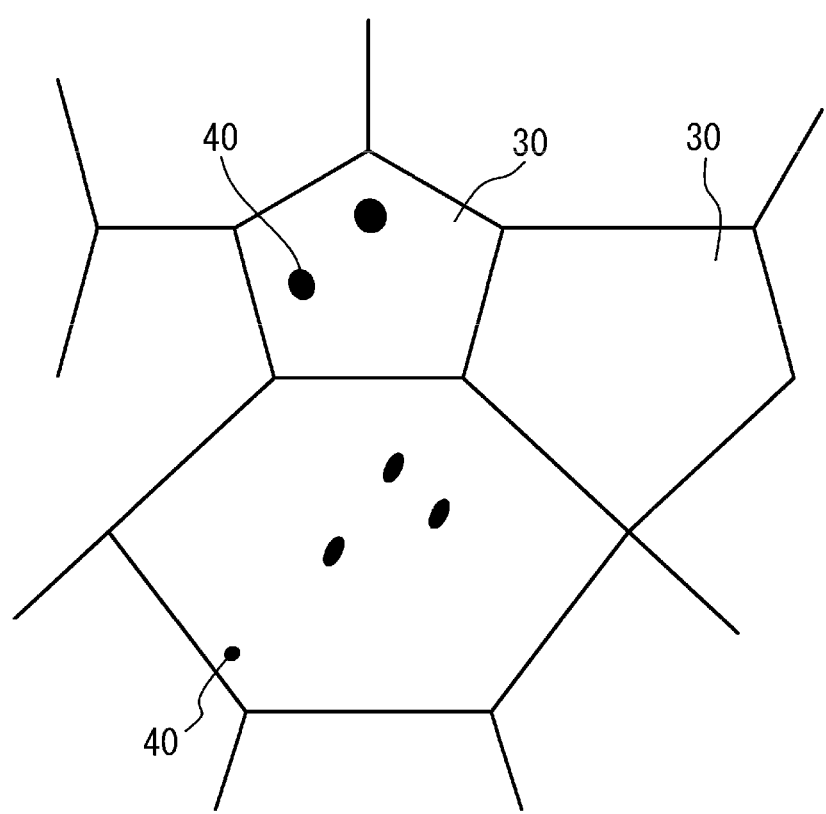
FIG. 7 illustrates ceramic grains in a dielectric layer.

FIG. 7 illustrates ceramic grains 30 in the dielectric layer 11. As illustrated in FIG. 7, the dielectric layer 11 contains one or more ceramic grains 30 as a main component. The ceramic grain 30 includes intragrain pores 40 thereinside.

When the ratio of the intragrain pores 40 in the ceramic grain 30 of the dielectric layer 11 is too small, sufficient withstand voltage characteristics may be unlikely to be obtained. Thus, it is preferable to set a lower limit for the ratio of the intragrain pores 40 in the ceramic grain 30 of the dielectric layer 11. Specifically, the area ratio, which is the ratio of the total cross-section area of the intragrain pores 40 to the total cross-section area of the ceramic grains 30 in the cross section (for example, the cross-section in the stack direction) of the dielectric layer 11, is preferably 2% or greater. To improve the withstand voltage characteristics, the area ratio is more preferably 5% or greater. The area ratio can be calculated from the TEM image of the cross-section of the dielectric layer 11.

On the other hand, when the ratio of the intragrain pores 40 in the ceramic grain 30 of the dielectric layer 11 is too large, the structure of the dielectric layer 11 becomes brittle, and the withstand voltage characteristics may deteriorate. Thus, it is preferable to set an upper limit for the ratio of the intragrain pores 40 in the ceramic grain 30 of the dielectric layer 11. Specifically, in the cross section (for example, the cross-section in the stack direction) of the dielectric layer 11, the ratio of the total cross-section area of the intragrain pores 40 to the total cross-section area of the ceramic grains 30 is preferably 10% or less. To sufficiently inhibit the reduction in electrostatic capacitance, the ratio is more preferably 7% or less.

Figure 8:
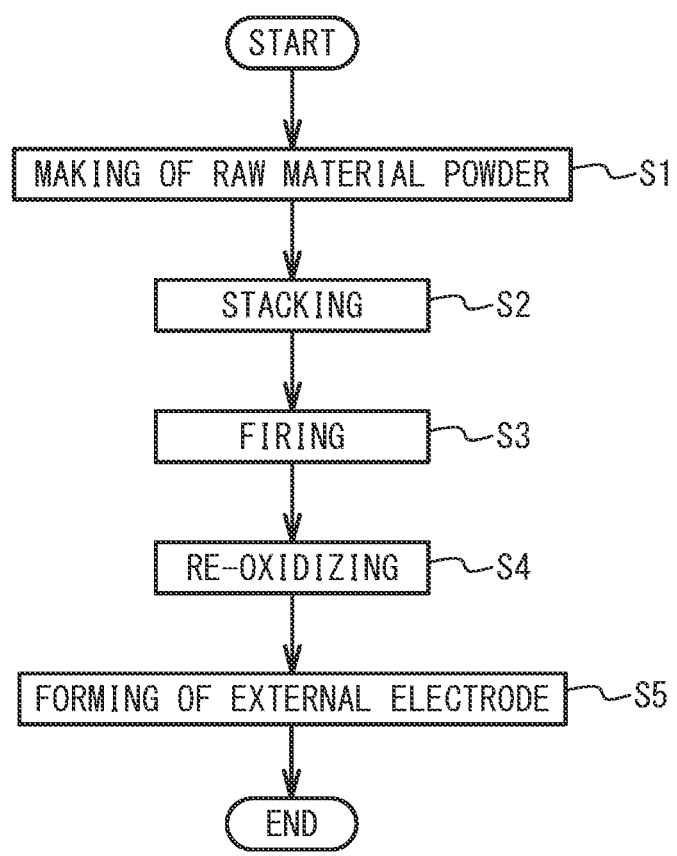
FIG. 8 is a flowchart of a method of manufacturing the multilayer ceramic capacitor.

Next, the manufacturing method of the multilayer ceramic capacitor 100 will be described. FIG. 8 is a flowchart of the manufacturing method of the multilayer ceramic capacitor 100.

[Making of Raw Material Powder (S1)]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high permittivity. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of magnesium (Mg), manganese (Mn), vanadium (V), chromium (Cr) or a rare earth element (yttrium (Y), samarium (Sm), europium (Eu), gadolinium (Gd), terbium (Tb), dysprosium (Dy), holmium (Ho), erbium (Er), thulium (Tm), and ytterbium (Yb)), or an oxide of cobalt (Co), Ni, lithium (Li), B, sodium (Na), potassium (K) or Si, or glass.

In the present embodiment, preferably, particles of the ceramic constituting the dielectric layer 11 is mixed with a compound containing additive compound, and is then calcined in a temperature range of 820° C. to 1150° C. Then, the resulting ceramic particles are wet-blended with additive compound, is dried and is crushed to prepare the ceramic powder. For example, the average particle size of the ceramic powder is adjusted to be 150 nm or less to reduce the thickness of the dielectric layer 11. In addition, the CV value (the standard deviation/the average particle size) of the ceramic powder is adjusted to be 30% or less. The resulting ceramic powder may be crushed as needed to adjust the particle size, or the particle size of the resulting material may be adjusted in combination with a classification treatment.

Next, an inverse pattern material for forming the end margin 15 and the side margin 16 is prepared. Additive compound is added to the ceramic powder of barium titanate obtained through the same process as the making process of the dielectric material described above, in accordance with purposes. The additive compound may be an oxide of Mg, Mn, V, Cr, or a rare-earth element (Y, Sm, Eu, Gd, Tb, Dy, Ho, Er, Tm, and Yb), an oxide of Co, Ni, Li, B, Na, K, or Si, or glass.

In the present embodiment, preferably, particles of ceramic constituting the end margins 15 and the side margins 16 is mixed with a compound containing additive compound, and is then calcined in a temperature range of 820° C. to 1150° C. Then, the resulting ceramic particles are wet-blended with additive compound, is dried and is crushed to prepare the ceramic powder. For example, the average particle size of the ceramic powder is adjusted to be 150 nm or less to reduce the thickness of the inverse pattern layer 17. In addition, the CV value (the standard deviation/the average particle size) of the ceramic powder is adjusted to be 38% or less. The resulting ceramic powder may be crushed as needed to adjust the particle size, or the particle size of the resulting material may be adjusted in combination with a classification treatment.

[Stacking Process (S2)]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of, for example, 0.8 µm or less is coated on a base material by, for example, a die coater method or a doctor blade method, and then dried.

Figure 9A:
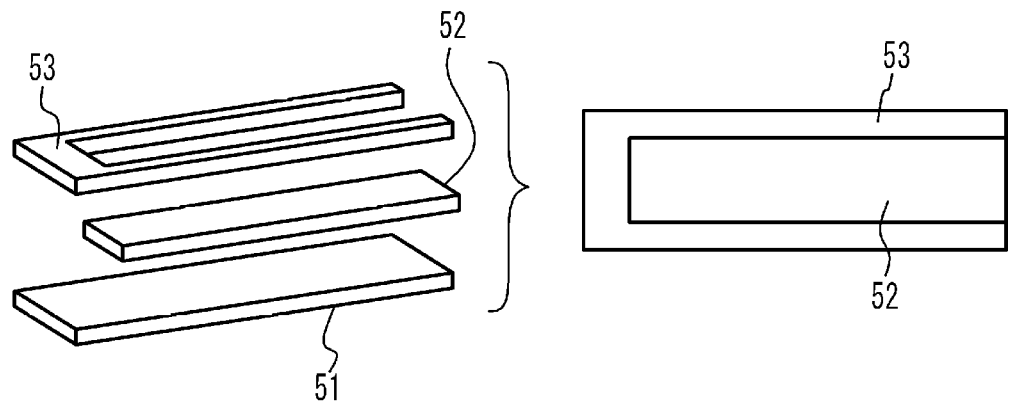
FIG. 9A and FIG. 9B illustrate a stacking process.

Next, as illustrated in FIG. 9A, a first pattern 52 of the internal electrode layer is formed on the surface of the dielectric green sheet 51 by printing a metal conductive paste for forming the internal electrode with use of screen printing or gravure printing. The metal conductive paste for forming the internal electrode contains an organic binder. Ceramic particles are added as a co-material to the metal conductive paste. The main component of the ceramic particles is not particularly limited, but is preferably the same as the main component ceramic of the dielectric layer 11. The thickness of the first pattern 52 is adjusted so that the thickness of the internal electrode layer 12 after firing is 0.45 µm or less.

Next, a binder such as an ethylcellulose-based binder and an organic solvent such as a terpineol-based solvent are added to an inverse pattern material and kneaded to obtain an inverse pattern paste of the inverse pattern layer. A second pattern 53 is formed by printing the inverse pattern paste in the peripheral region, where no first pattern 52 is printed, on the dielectric green sheet 51 to cause the second pattern 53 and the first pattern 52 to form a flat surface. The dielectric green sheet 51, the first pattern 52, and the second pattern 53 form a stack unit.

Figure 9B:
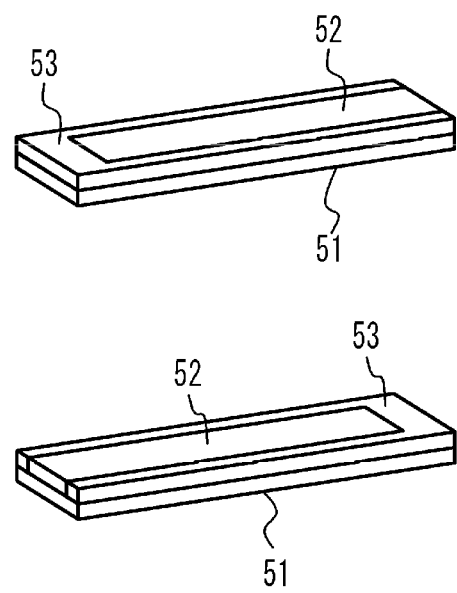

Thereafter, a predetermined number of the stack units are stacked while the base material is peeled so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations as illustrated in FIG. 9B. For example, 100 to 500 stack units are stacked. Thereafter, cover sheets, which are to be the cover layers 13, are compressed on and under the multilayer structure of the stacked dielectric green sheets 51 to obtain a ceramic multilayer structure.

[Firing Process (S3)]

The resulting ceramic multilayer structure is fired in a reducing atmosphere with an oxygen partial pressure of $10^{-5}$ to $10^{-8}$ atm in a temperature range of 1100° C. to 1300° C. for 10 minutes to 2 hours. This causes each compound to be sintered and grow grains. Through this process, the multilayer chip 10 is obtained. In the firing process, the firing conditions are adjusted so that the average crystal grain size of the dielectric portions that are in contact with respective external electrodes 20a and 20b becomes 200 nm or less, and the CV value of the grain size distribution of the crystal grains becomes less than 38%. The firing conditions include a firing temperature, a holding time at the firing temperature, a rate of temperature increase, a rate of temperature decrease, and an atmosphere.

[Re-Oxidizing Process (S4)]

Thereafter, the re-oxidizing process is performed in a $N_2$ gas atmosphere in a temperature range of 600° C. to 1000° C.

[Forming Process of External Electrodes (S5)]

Next, the external electrodes 20a and 20b are formed on the multilayer chip 10. For example, the base layer 21 is formed on each of the two edge faces of the multilayer chip 10 by, for example, physical vapor deposition (PVD) such as sputtering or chemical vapor deposition (CVD). Alternatively, the base layers 21 may be formed by applying a metal conductive paste for forming the external electrode containing a metal filler, a glass frit, a binder, and a solvent on each of the two edge faces of the multilayer chip 10, and then baking the applied metal conductive paste. Alternatively, the base layers 21 may be formed by disposing the metal conductive paste for forming the external electrode on each of the two edge faces of the ceramic multilayer structure before firing, and firing the metal conductive paste at the same time as the ceramic multilayer structure. After the base layers 21 are formed, the Cu plated layer 22, the Ni plated layer 23, and the Sn plated layer 24 are sequentially formed on each of the base layers 21 by plating.

In the manufacturing method in accordance with the present embodiment, sufficiently small average crystal grain size and sufficiently sharp grain size distribution are achieved because the average crystal grain size of the dielectric portions that are in contact with the respective external electrodes 20a and 20b becomes 200 nm or less and the CV value of the grain size distribution of the crystal grains becomes less than 38%. Therefore, the large bond strength between the dielectric portions and the respective external electrodes 20a and 20b is achieved, thereby inhibiting peeling of the external electrodes 20a and 20b. The firing conditions are preferably adjusted so that the average crystal grain size of the dielectric portions becomes 180 nm or less, more preferably adjusted so that the average crystal grain size of the dielectric portions becomes 150 nm or less. In addition, the firing conditions are preferably adjusted so that the CV value becomes 35% or less, more preferably adjusted so that the CV value becomes 30% or less.

In the present embodiment, the second pattern 53 corresponding to the inverse pattern layer 17 is printed, but this does not intend to suggest any limitation. For example, the first pattern 52 may be printed on the dielectric green sheet 51 and the second pattern may not be necessarily printed.

In the above embodiment, the multilayer ceramic capacitor has been described as an example of the ceramic electronic component. However, the ceramic electronic component is not limited to the multilayer ceramic capacitor. For example, the ceramic electronic component may be other electronic components such as a varistor and a thermistor.

EXAMPLES

The multilayer ceramic capacitor in accordance with the embodiment was fabricated, and the characteristics thereof were examined.

Example 1

In the example 1, additives were added to barium titanate powder having an average particle size of 150 nm and a CV value of the particle size distribution of 25%, and were sufficiently wet-blended and crushed in a ball mill to obtain a dielectric material. Additives were added to barium titanate powder having an average particle size of 150 nm and a CV value of the particle size distribution of 25%, and were sufficiently wet-blended and crushed in a ball mill to obtain an inverse pattern material.

An organic binder and solvents were added to the dielectric material, and the dielectric green sheets 51 were made by a doctor blade method. The organic binder was a butyral-based binder. The solvents were toluene and ethyl alcohol. The first pattern 52 of the metal conductive paste was printed on the resulting dielectric green sheet 51. A binder such as an ethylcellulose-based binder and an organic solvent such as a terpineol-based solvent were added to the inverse pattern material, and kneaded with a roll mill to make the inverse pattern paste for inverse pattern. The resulting inverse pattern paste was printed, as the second pattern 53, in the region where no first pattern 52 was printed on the dielectric green sheet 51. Then, 451 dielectric green sheets 51, each on which the first pattern 52 and the second pattern 53 were printed, were stacked. The cover sheets were stacked on and under the multilayer structure of the dielectric green sheets 51, and the resulting multilayer structure was heated and compressed.

Thereafter, a binder was removed in a $N_2$ atmosphere. The resulting ceramic multilayer structure was fired under a reducing atmosphere ($O_2$ partial pressure: $10^{-5}$ to $10^{-8}$ atm) at a firing temperature of 1260° C. to obtain a sintered compact. The shape size was a length of 1.0 mm, a width of 0.5 mm, and a height of 0.5 mm. After the sintered compact was re-oxidized under an $N_2$ atmosphere at 800° C., the base layer 21 was formed on each of both edge faces of the resulting multilayer chip 10 by sputtering. Thereafter, the Cu plated layer 22, the Ni plated layer 23, and the Sn plated layer 24 were formed on each of the base layers 21 by plating. Through this process, the multilayer ceramic capacitor 100 was obtained.

In the following examples and comparative examples, the dielectric portion of which the crystal grain size was measured was a region within 5 μm from the external electrode. For a single crystal grain, the short diameter, which is the shortest length of the lengths of straight lines crossing the single crystal grain, and the long diameter, which is the longest length of the lengths of the straight lines crossing the single crystal grain, were measured, and (the short diameter+the long diameter)/2 was determined as the crystal grain size.

As presented in FIG. 10A, the observation of the cross-section with a scanning electron microscope (SEM) indicated that the thickness of the base layer 21 was 12.1 μm, the thickness of the internal electrode layer 12 was 0.43 μm, and the thickness of the dielectric layer 11 was 0.53 μm. The average crystal grain size of the dielectric portion in the end margin 15 was 183 nm. The CV value of the grain size distribution of the dielectric portion was 24%. The crystal grain size and the CV value were calculated using the cross-section image observed with the SEM. Specifically, used was an SEM image observed at 10,000-fold magnification so that 200 crystal grains could be observed.

Example 2

In the example 2, the amount of trace additives (a rare-earth element, Mn, Si, Ba) of the dielectric material was increased so that grain growth did not occur in the dielectric layer 11. Other conditions were the same as those of the example 1. As presented in FIG. 10A, the observation of the cross-section with the SEM indicated that the thickness of the base layer 21 was 12.3 μm, the thickness of the internal electrode layer 12 was 0.44 μm, and the thickness of the dielectric layer 11 was 0.55 μm. The average crystal grain size of the dielectric portion in the vicinity of the external electrode was 151 nm. The CV value of the grain size distribution of the dielectric portion was 26%.

Example 3

In the example 3, barium titanate powder having an average particle size of 100 nm and a CV value of the particle size distribution of 35% was used for the dielectric material and the inverse pattern material. Other conditions were the same as those of the example 1. As presented in FIG. 10A, the observation of the cross-section with the SEM indicated that the thickness of the base layer 21 was 12.5 μm, the thickness of the internal electrode layer 12 was 0.43 μm, and the thickness of the dielectric layer 11 was 0.54 μm. The average crystal grain size of the dielectric portion in the vicinity of the external electrode was 132 nm. The CV value of the grain size distribution of the dielectric portion was 29%.

Example 4

In the example 4, barium titanate powder having an average particle size of 100 nm and a CV value of the particle size distribution of 35% was used for the dielectric material and the inverse pattern material. In addition, the amount of trace additives (a rare-earth element, Mn, Si, Ba) of the dielectric material was increased so that grain growth did not occur in the dielectric layer 11. Other conditions were the same as those of the example 1. As presented in FIG. 10A, the observation of the cross-section of the SEM indicated that the thickness of the base layer 21 was 11.9 μm, the thickness of the internal electrode layer 12 was 0.45 μm, and the thickness of the dielectric layer 11 was 0.55 μm. The average crystal grain size of the dielectric portion in the vicinity of the external electrode was 101 nm. The CV value of the grain size distribution of the dielectric portion was 35%.

Comparative Example 1

In the comparative example 1, the thickness of the first pattern 52 was increased, 401 dielectric green sheets 51, each on which the first pattern 52 and the second pattern 53 were printed, were stacked, and the firing temperature was 1280° C. Other conditions were the same as those of the example 1. As presented in FIG. 10A, the observation of the cross-section with the SEM indicated that the thickness of the base layer 21 was 19.1 μm, the thickness of the internal electrode layer 12 was 0.61 μm, and the thickness of the dielectric layer 11 was 0.55 μm. The average crystal grain size of the dielectric portion in the vicinity of the external electrode was 203 nm. The CV value of the grain size distribution of the dielectric portion was 19%.

Comparative Example 2

In the comparative example 2, the firing temperature was 1280° C. Other conditions were the same as those of the example 1. As presented in FIG. 10A, the observation of the cross-section with the SEM indicated that the thickness of the base layer 21 was 12.3 μm, the thickness of the internal electrode layer 12 was 0.45 μm, and the thickness of the dielectric layer 11 was 0.56 μm. The average crystal grain size of the dielectric portion in the vicinity of the external electrode was 210 nm. The CV value of the grain size distribution of the dielectric portion was 20%.

Comparative Example 3

In the comparative example 3, barium titanate powder having an average particle size of 80 nm and a CV value of the particle size distribution of 38% was used for the dielectric material and the inverse pattern material. Other conditions were the same as those of the example 1. As presented in FIG. 10A, the observation of the cross-section with the SEM indicated that the thickness of the base layer 21 was 12.2 μm, the thickness of the internal electrode layer 12 was 0.46 μm, and the thickness of the dielectric layer 11 was 0.53 μm. The average crystal grain size of the dielectric portion in the vicinity of the external electrode was 95 nm. The CV value of the grain size distribution of the dielectric portion was 38%.

Comparative Example 4

In the comparative example 4, barium titanate powder having an average particle size of 50 nm and a CV value of the particle size distribution of 42% was used for the dielectric material and the inverse pattern material. Other conditions were the same as those of the example 1. The observation of the cross-section with the SEM indicated that the thickness of the base layer 21 was 12.1 μm, the thickness of the internal electrode layer 12 was 0.46 μm, and the thickness of the dielectric layer 11 was 0.55 μm. The average crystal grain size of the dielectric portion in the vicinity of the external electrode was 71 nm. The CV value of the grain size distribution of the dielectric portion was 49%

[Analysis]

For the multilayer ceramic capacitors of the examples 1 to 4 and the comparative examples 1 to 4, it was checked whether there was peeling of the external electrode. When peeling of the external electrode was not observed, it was determined that the multilayer ceramic capacitor was acceptable "O", and when peeling of the external electrode was observed, it was determined that the multilayer ceramic capacitor was rejectable "×". The results are presented in FIG. 10B. As presented in FIG. 10B, peeling of the external electrode was not observed in any one of the examples 1 to 4. This is considered because the large bond strength between the dielectric portion and the external electrode was achieved since the average crystal grain size of the dielectric portion that was in contact with the external electrode became 200 nm or less and the CV value of the grain size distribution of the crystal grains became less than 38%.

In contrast, in the comparative examples 2 to 4, peeling of the external electrode was observed. This is considered because the average crystal grain size of the dielectric portion that was in contact with the external electrode became greater than 200 nm, and thereby the contact area between the dielectric portion and the external electrode decreased in the comparative example 2. The reason why peeling of the external electrode was observed in the comparative examples 3 and 4 is considered because the CV value of the grain size distribution of the dielectric portion became 38% or greater, and thereby the grain size distribution became broad. The reason why peeling of the external electrode was not observed in the comparative example 1 is considered because the internal electrode layer 12 was thickly formed.

Next, a moisture resistance test was conducted for the multilayer ceramic capacitors of the examples 1 to 4 and the comparative examples 2 to 4. In the moisture resistance test, a voltage of 4V was applied to the multilayer ceramic capacitor for 1000 hours or more at 85° C. and 85% RH, and it was then checked whether failure was observed. When no failure was observed, it was determined that the multilayer ceramic capacitor was acceptable "O", and when failure was observed, it was determined that the multilayer ceramic capacitor was rejectable "×". The results are presented in FIG. 10B. As presented in FIG. 10B, all the multilayer ceramic capacitors of the examples 1 to 4 were determined to be acceptable in the moisture resistance test. This is considered because the external electrode did not peel. On the other hand, the multilayer ceramic capacitors of the comparative examples 2 to 4 were determined to be rejectable in the moisture resistance test. This is considered because the external electrode peeled.

Next, the capacitances (µF) of the multilayer ceramic capacitors of the examples 1 to 4 and the comparative examples 1 to 4 were measured. The capacitance was measured by an LCR meter at 1 kHz-1 Vrms. The results are presented in FIG. 10B. As presented in FIG. 10B, a large capacitance was not obtained in the comparative example 1, 3, or 4. This is considered because the internal electrode layer 12 was thickly formed and thereby the number of the stacked internal electrode layers 12 was decreased in the comparative example 1. The reason why a large capacitance was not obtained in the comparative example 3 or 4 is considered because the average crystal grain size of the dielectric portion became small.

Next, for the multilayer ceramic capacitors of the examples 1 to 4 and the comparative examples 2 to 4, the ratio of pores within the crystal grain in the dielectric layer 11 in the capacitance region 14 was measured, and a withstand voltage test was conducted. To examine the ratio of the intragrain pores 40 within the ceramic grain 30 of the dielectric layer 11, the TEM observation was conducted, and the photo of the TEM image was taken and used to calculate the area ratio of the intragrain pores 40. In the withstand voltage test, the breakdown voltage was measured when the voltage was increased from 1 V to 200 V at 25° C. For the examples 1 to 4 and the comparative examples 2 to 4, the 50% average lifetime (V) of 50 samples was measured, and determined as a BDV. The results are presented in FIG. 10C. As presented in FIG. 10C, in the examples 1 to 4, the BDV was greater than 30 V. This is considered because the withstand voltage was increased by adjusting the ratio of pores to be 2% or greater and 10% or less. In the comparative examples 2 to 4, the BDV was less than 30V. This is considered because the ratio of pores was out of a range of 2% or greater and 10% or less.

Although the embodiments of the present invention have been described in detail, it is to be understood that the various change, substitutions, and alterations could be made hereto without departing from the spirit and scope of the invention.

What is claimed is:

1. A ceramic electronic component comprising:
    a multilayer chip having a substantially rectangular parallelepiped shape and including dielectric layers and internal electrode layers that are alternately stacked, the dielectric layers being mainly composed of ceramic, the internal electrode layers being alternately exposed to two edge faces of the multilayer chip opposite to each other; and
    a pair of external electrodes respectively formed on the two edge faces, the pair of external electrodes including neither glass nor ceramic,
    wherein an average crystal grain size of the ceramic in a cross section is 151 nm or less in a dielectric portion that is in contact with one of the external electrodes, and a CV value of a grain size distribution of crystal grains of the ceramic in the cross section is 26% or more and 35% or less in the dielectric portion, the dielectric portion being defined as a region made of the ceramic in the multilayer chip that is in contact with the one of the external electrodes and that has a width of 5 µm from said one of the external electrodes.

2. The ceramic electronic component according to claim 1, wherein each of the internal electrode layers has a thickness of 0.45 µm or less.

3. The ceramic electronic component according to claim 1, wherein the dielectric portion is in an end margin where first internal electrode layers of the internal electrode layers face each other with no second internal electrode layer interposed therebetween, the first internal electrode layers being exposed to a first edge face of the two edge faces, the second internal electrode layer being exposed to a second edge face different from the first edge face of the two edge faces.

4. The ceramic electronic component according to claim 1,
    wherein each of the external electrodes has a structure in which a plated layer is formed on a base layer, and
    wherein the base layer has a thickness of 12.5 µm or less.

5. The ceramic electronic component according to claim 4, wherein the base layer is a sputtering film or a chemical-vapor-deposited film.

6. The ceramic electronic component according to claim 1, wherein a pore is formed inside the crystal grain, and a ratio of a cross-section area of the pore to a cross-section area of the crystal grain of the ceramic is 2% or greater and 10% or less in a cross-section of each of the dielectric layers.

7. The ceramic electronic component according to claim 6, wherein the dielectric layers have thicknesses of 0.5 μm or less.

8. A method of manufacturing a ceramic electronic component, the method comprising:
- alternately stacking green sheets for dielectric layers and conductive pastes for internal electrode layers so that the internal electrode layers are alternately exposed to two edge faces opposite to each other so as to form a ceramic multilayer structure having a substantially rectangular parallelepiped shape;
- firing the ceramic multilayer structure to form a multilayer chip; and
- forming a pair of external electrodes respectively on two edge faces of the multilayer chip, the pair of external electrodes including neither glass nor ceramic,
- wherein the firing includes adjusting a firing condition so that an average crystal grain size of ceramic, which is a main component of the dielectric layers, in a cross section becomes 151 nm or less in a dielectric portion that is in contact with at least one of the external electrodes, and a CV value of a grain size distribution of crystal grains of the ceramic in the cross section becomes 26% or more and 35% or less in the dielectric portion, the dielectric portion being defined as a region made of the ceramic in the multilayer chip that is in contact with the one of the external electrodes and that has a width of 5 μm from said one of the external electrodes.

9. The ceramic electronic component according to claim 6, wherein a pore is formed inside the crystal grain, and a ratio of a cross-section area of the pore to a cross-section area of the crystal grain of the ceramic is 2% or greater and 5% or less in a cross-section of each of the dielectric layers.

10. The method according to claim 8, wherein the pair of external electrodes are made by a physical vapor deposition or a chemical vapor deposition.

* * * * *